(12) United States Patent
Dai et al.

(10) Patent No.: US 11,237,583 B2
(45) Date of Patent: Feb. 1, 2022

(54) METHOD, DEVICE, AND COMPUTER PROGRAM PRODUCT

(71) Applicant: Huawei Technologies Co., Ltd., Shenzhen (CN)

(72) Inventors: Yunxiang Dai, Nanjing (CN); Kairen Wei, Shenzhen (CN); Zhengsheng Xie, Shanghai (CN); Shiyong Fu, Nanjing (CN); Hua Chen, Nanjing (CN); Xingbin Yin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 16/700,536

(22) Filed: Dec. 2, 2019

(65) Prior Publication Data
US 2020/0174509 A1    Jun. 4, 2020

(30) Foreign Application Priority Data
Nov. 30, 2018   (CN) .......................... 201811457744.0

(51) Int. Cl.
| G05F 1/625 | (2006.01) |
| G05F 1/26 | (2006.01) |
| H02J 13/00 | (2006.01) |
| H02J 1/08 | (2006.01) |

(52) U.S. Cl.
CPC ................ *G05F 1/625* (2013.01); *G05F 1/26* (2013.01); *H02J 13/00* (2013.01); *H02J 13/0005* (2020.01); *H02J 1/08* (2013.01)

(58) Field of Classification Search
CPC .. G05F 1/625; G05F 1/26; H02J 1/084; H02J 13/0005; H02J 13/00016; H02J 13/00; H02J 2310/60; H02J 1/08; G06F 1/266
See application file for complete search history.

(56) References Cited

U.S. PATENT DOCUMENTS

| 9,768,832 | B2* | 9/2017 | Nishibayashi | ......... H04B 3/542 |
| 9,859,712 | B2* | 1/2018 | Nishibayashi | .......... H02J 3/383 |
| 2009/0113221 | A1 | 4/2009 | Holle et al. | |
| 2012/0151240 | A1* | 6/2012 | Robinson | .............. G06F 1/3287 |
| | | | | 713/340 |
| 2012/0173177 | A1 | 7/2012 | Nishiyama et al. | |

(Continued)

FOREIGN PATENT DOCUMENTS

| CN | 1371541 A | 9/2002 |
| CN | 101055997 A | 10/2007 |

(Continued)

*Primary Examiner* — Emily P Pham
(74) *Attorney, Agent, or Firm* — Conley Rose, P.C.

(57) ABSTRACT

This disclosure discloses a power supply method and a power supply device, and pertains to the field of power supply technologies. The method includes: supplying, by a power supply device, power to a load through a power supply port, where the power supply port is connected to a power receiving port of the load by using a power supply cable; and communicating, by the power supply device, with the load through a communications port, to manage a behavior of obtaining power by the load from the power supply device, where the communications port is connected to a communications port of the load by using a communications cable. In this disclosure, the power supply device is a power supply of the load and a controller of the load.

20 Claims, 3 Drawing Sheets

(56) References Cited

U.S. PATENT DOCUMENTS

2014/0195831 A1    7/2014  Hamdi et al.
2017/0102753 A1*   4/2017  Lambert ............. G06F 13/4282

FOREIGN PATENT DOCUMENTS

| CN | 102484395 A  | 5/2012  |
| CN | 204461567 U  | 7/2015  |
| CN | 108803431 A  | 11/2018 |
| JP | 2004064960 A | 2/2004  |
| JP | 2010279088 A | 12/2010 |

* cited by examiner

METHOD, DEVICE, AND COMPUTER PROGRAM PRODUCT

CROSS-REFERENCE TO RELATED APPLICATION

This application claims priority to Chinese Patent Application No. 201811457744.0, filed on Nov. 30, 2018, which is hereby incorporated by reference in its entirety.

TECHNICAL FIELD

This disclosure relates to the field of power supply technologies, and in particular, to a power supply method, a power supply device, and a storage medium.

BACKGROUND

To facilitate intelligent management of urban traffic, loads such as a video monitor and an electronic display board need to be deployed at locations such as a traffic hub. How to supply power to these loads has become a problem that needs to be resolved in many cities at present.

SUMMARY

This disclosure provides a power supply method, a power supply device, and a storage medium, to improve flexibility of supplying power by the power supply device to a load.

According to a first aspect, a power supply method is provided. The method includes supplying, by a power supply device, power to a load through a power supply port, where the power supply port is connected to a power receiving port of the load by using a power supply cable; and communicating, by the power supply device, with the load through a communications port, to manage a behavior of obtaining power by the load from the power supply device, where the communications port is connected to a communications port of the load by using a communications cable.

In this disclosure, the power supply device supplies power to the load through the power supply port, and then manages, through the communications port, the obtaining of power by the load from the power supply device. The power supply device is a power supply of the load and a controller of the load. This integrated design reduces complexity of a system. In addition, a power supply process between the power supply device and the load and a communication process between the power supply device and the load are physically isolated from each other, thereby improving flexibility of supplying power by the power supply device to the load.

Optionally, the power supply device includes a plurality of power supply ports. The power supply method further includes: measuring, by the power supply device, an output power of each of the plurality of power supply ports; determining, by the power supply device based on content of communication between the power supply device and the load through the communications port, that a power-obtaining power of the load increases by a target value; and searching for, by the power supply device, a power supply port whose output power increases by the target value, to obtain and record a correspondence between a power supply port connected to the load and a communications port connected to the load. The power supply device manages obtaining power by the load from the power supply device includes: managing, by the power supply device based on the correspondence and content of communication between the load and the communications port connected to the load, a behavior of obtaining power by the load from the power supply port connected to the load.

When the power supply device includes a plurality of power supply ports, the power supply device may establish, based on a "power change", a correspondence between a power supply port and a communications port that are connected to a single load, to manage, based on the correspondence, obtaining power by the load from the power supply port, thereby accurately managing power-obtaining behavior of the load.

Optionally, the power supply device manages obtaining power by the load from the power supply device including steps of: limiting, by the power supply device based on a first power threshold, power at which the power supply port supplies power to the load; sending, by the power supply device, a power indication to the load through the communications port, where the power indication carries a second power threshold, the second power threshold is less than the first power threshold, and the power indication is used to indicate that the power at which the load obtains power from the power supply device is limited by the second power threshold; and limiting, by the power supply device based on the second power threshold, the power at which the power supply port supplies power to the load.

When power that can be provided by the power supply device is insufficient to meet requirements of all loads, the power supply device may reduce power-obtaining of one or some loads in the foregoing manner, thereby further improving flexibility of supplying power by the power supply device to the load.

Optionally, supplying, by a power supply device, power to a load through a power supply port includes: when the load is initially connected to the power supply port of the power supply device, limiting, by the power supply device based on an initial power threshold, a power at which the power supply port supplies power to the load. Correspondingly, the communicating, by the power supply device, with the load through a communications port, to manage obtaining power by the load from the power supply device includes: obtaining, by the power supply device, a third power threshold based on the content of communication between the power supply device and the load through the communications port, where the third power threshold is greater than the initial power threshold; and limiting, by the power supply device based on the third power threshold, the power at which the power supply port supplies power to the load.

When the load is initially connected to the power supply device, the power supply device temporarily provides a low power to enable the load to obtain sufficient energy to communicate with the power supply device, whereby the power supply device can subsequently communicate with the load through the communications port to determine a formal power threshold. In this way, a power threshold of the power supply port may be increased based on an actual requirement of the load, thereby avoiding unnecessary power waste.

According to a second aspect, a power supply device is provided. The power supply device has a function of implementing a power supply method in the first aspect. The power supply device includes at least one module, and the at least one module is configured to implement the power supply method.

According to a third aspect, a power supply device is provided. The power supply device includes at least one power supply port, a processor, and at least one communications port. At least one power supply port is configured to supply power to a load, and the power supply port is connected to a power receiving port of the load by using a power supply cable. The processor communicates with the load through one of the at least one communications ports, to manage obtaining power by the load from the power supply device, and the communications port is connected to a communications port of the load by a communications cable.

Technical effects obtained in the second aspect and the third aspect are similar to technical effects obtained by using a corresponding technical means in the first aspect. Details are not described herein again.

DESCRIPTION OF EMBODIMENTS

To make the objectives, technical solutions, and advantages of this disclosure clearer, the following further describes the implementations in detail with reference to the accompanying drawings.

Before a power supply method provided in the embodiments is described, an application scenario is first described. At present, as a requirement for a safe city increases, an intelligent transportation system is adopted in a growing quantity of cities. The intelligent transportation system means that loads such as a high-definition video monitor, an intersection electronic display board, and a traffic intersection strobe light are mounted at all traffic hubs of a city, and an intelligent transportation server manages the loads together, to implement intelligent management of urban traffic. A power supply device supplies power to the loads, to ensure normal running of the loads. A communications device provides a communication connection between a load and a server. However, in the power supply method provided in the embodiments of this disclosure, the communications device is integrated into the power supply device to supply power to the load and provide a communication service.

Figure 1:
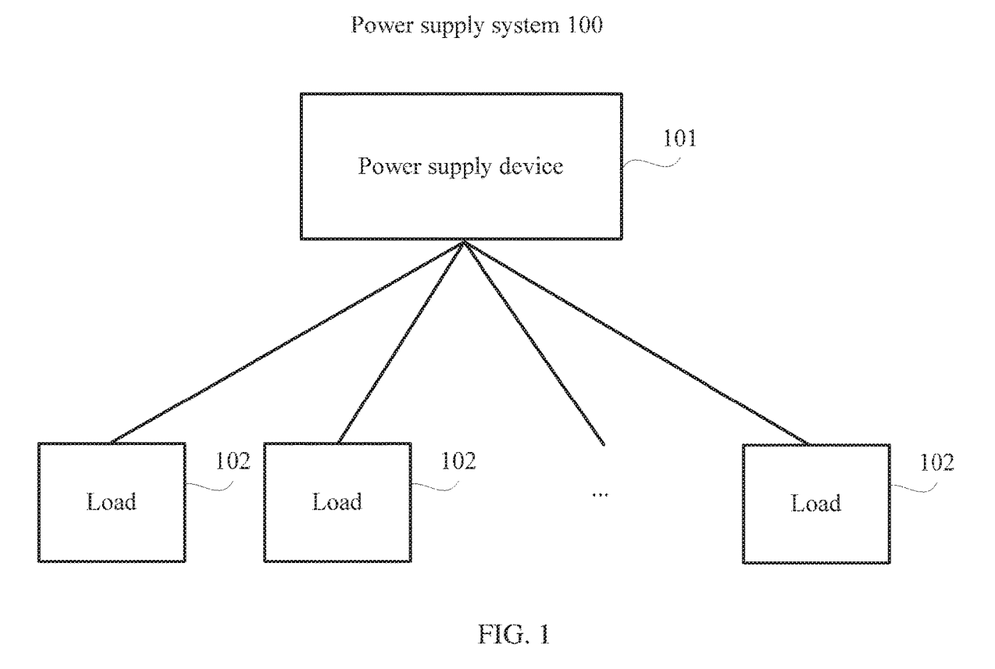
FIG. 1 is a schematic diagram of a power supply system according to an embodiment.

FIG. 1 is a schematic diagram of a power supply system according to an embodiment of this disclosure. As shown in FIG. 1, the power supply system 100 includes a power supply device 101 and at least one load 102. The power supply device 101 is connected to each load 102, supplies power to each load 102, and communicates with each load 102.

Figure 2:
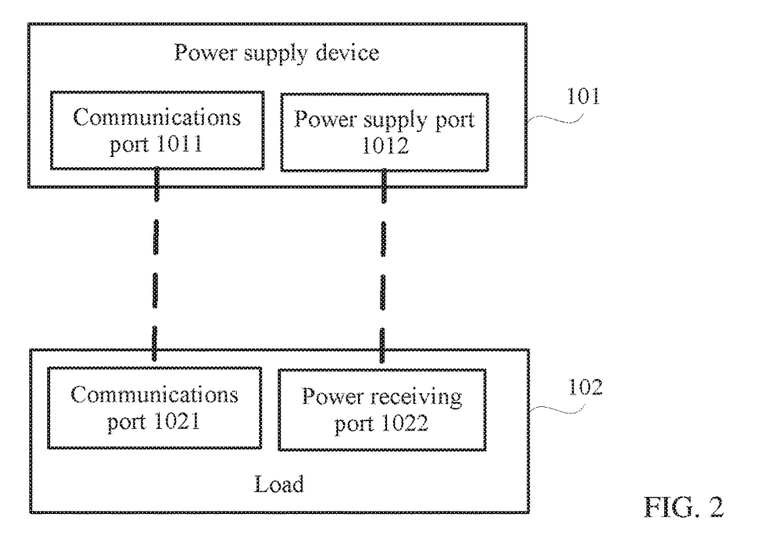
FIG. 2 is a schematic diagram of a connection relationship between a power supply device and a load according to an embodiment.

The following uses one load 102 as an example to describe a connection relationship between the power supply device 101 and the load 102. In a possible implementation, as shown in FIG. 2, the power supply device 101 includes one communications port 1011 and one power supply port 1012. The communications port 1011 and the power supply port 1012 are different physical ports. The load 102 includes one communications port 1021 and one power receiving port 1022. The communications port 1021 and the power receiving port 1022 are different physical ports. The communications port 1011 is connected to the communications port 1021 by using a communications cable, and the power supply port 1012 is connected to the power receiving port 1022 by using a power supply cable. The communications port 1011 and the communications port 1021 each may be an electrical interface or an optical interface, such as an Ethernet interface. For example, the communications port 1011 and the communications port 1021 each are an 8-position 8-contact (8P8C) modular interface that is also referred to as an RJ-45 interface. Correspondingly, the communications cable is an Ethernet twisted pair. For another example, the communications port 1011 and the communications port 1021 each are an optical module, such as a small form-factor pluggable (SFP) transceiver or a 10-gigabit small form-factor pluggable (XFP) transceiver. Correspondingly, the communications cable is an optical fiber. The power supply port 1012 and the power receiving port 1022 each may be a power output end, such as a pluggable wiring terminal.

It can be learned from the connection relationship shown in FIG. 2 that in this embodiment of this disclosure, the power supply device 101 supplies power to the load 102 through the power supply port, and then communicates with the load 102 through the communications port. A power supply process between the power supply device 101 and the load 102 and a communication process between the power supply device and the load 102 are physically isolated from each other, thereby improving flexibility of supplying power by the power supply device 101 to the load 102.

For a detailed connection relationship between each load 102 shown in FIG. 1 and the power supply device 101, refer to FIG. 2. Details are not described herein again.

The power supply device 101 may include only one power supply port, and correspondingly, the power supply system 100 may include only one load 102. The power supply device 101 may include a plurality of power supply ports, and correspondingly, the power supply system 100 may include one or more loads 102. Three loads 102 are only used as an example for description in FIG. 1, and constitute no limitation on a quantity of loads included in the power supply system provided in this disclosure.

Figure 3:
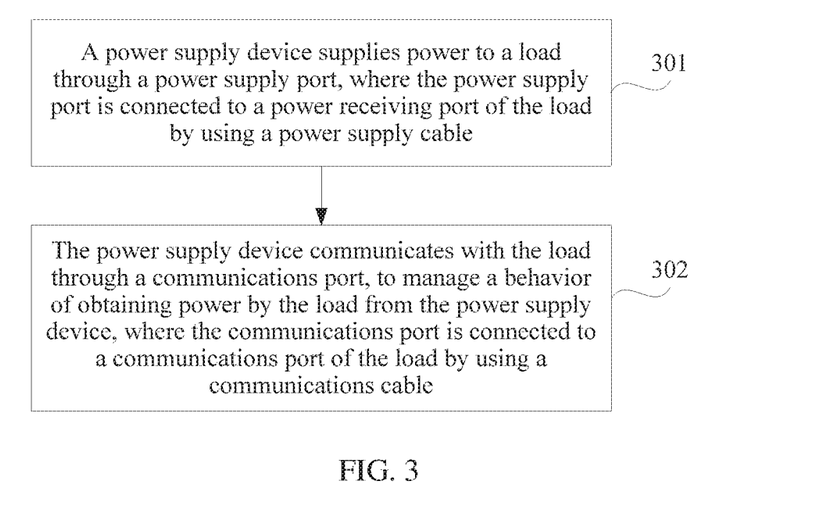
FIG. 3 is a flowchart of a power supply method according to an embodiment.

FIG. 3 is a flowchart of a power supply method according to an embodiment of this disclosure. The method is applied to the power supply device shown in FIG. 1 or FIG. 2. As shown in FIG. 3, the method includes the following steps.

Step 301: The power supply device supplies power to a load through a power supply port, where the power supply port is connected to a power receiving port of the load by a power supply cable.

In this embodiment, after the power receiving port of the load is connected to the power supply port of the power supply device, the load may obtain power from the power supply device based on a power required by the load. For example, when the load requires a power of 5 watts (W), a power at which the load obtains power from the power supply device is 5 W.

In a process in which the power supply device supplies power to the load through the power supply port, the power supply device may manage, by following step 302, obtaining power by the load from the power supply device, to improve flexibility of supplying power by the power supply device to the load. For a specific implementation, refer to descriptions in step 302.

When the load is initially connected to the power supply port of the power supply device, the power supply device may limit, based on an initial power threshold, a power at which the power supply port supplies power to the load. When the load is connected to the power supply device for the first time, a maximum power-supply power of the power supply port through which the power supply device is connected to the load is the initial power threshold. The initial power threshold may be a maximum power that can be provided by the power supply device through a single power supply port, namely, a rated power of the single power supply port. Alternatively, the initial power threshold may be less than the rated power of the single power supply port. Alternatively, the power supply device may not set the initial power threshold.

The initial power threshold may be preset by a manufacturer. In a possible implementation, the manufacturer may preset the initial power threshold based on a start power of each load to be connected to the power supply device, to ensure that after each load is initially connected to the power supply device, the load may obtain power that can be used to start a system of the load. Therefore, in this embodiment, when the load is connected to the power supply device for the first time, the load obtains power through the power receiving port to start a system of the load. Only after the system of the load is started, the power supply device can communicate with the load, to manage, by following step 302, obtaining power by the load from the power supply device.

For example, the initial power threshold may be 15 W, and the initial power threshold may basically ensure start of loads such as a high-definition video monitor, an intersection electronic display board, and a traffic intersection strobe light.

In addition, after the system of the load is started, the power supply device may communicate with the load based on a reference protocol. For example, the reference protocol may be a link layer discovery protocol (LLDP) or another protocol. For a specific implementation in which the power supply device communicates with the load based on the reference protocol, refer to step 302. Details are not described herein. In addition, when the reference protocol is the LLDP protocol, after the power supply device communicates with the load, content of communication between the power supply device and the load may be sent as data in a type-length-value (TLV) format. Details are not described herein.

In addition, in this embodiment, there is no limitation on a sequence between step 301 and step 302. The power supply device usually communicates with the load while supplying power to the load.

Step 302: The power supply device communicates with the load through a communications port, to manage obtaining power by the load from the power supply device, where the communications port is connected to a communications port of the load by communications cable.

The power supply device communicates with the load through a communications port. Obtaining power by the load from the power supply device may mean that the power supply device negotiates, based on content of communication performed through the communications port, with the load about a power threshold at which the load obtains power from the power supply port. After completing the negotiation about the power threshold, the power supply device manages power-obtaining behavior of the load based on a power threshold obtained after the negotiation. For example, the power threshold obtained after the negotiation is 50 W. If the power-obtaining power of the load exceeds 50 W, the power supply device cuts off power supply for the power supply port connected to the load. If the power-obtaining power of the load does not exceed 50 W, the power supply device does not perform any operation.

If the power supply device has only one power supply port, correspondingly, the power supply system shown in FIG. 1 may include only one load. In this case, the power supply device may directly perform, based on the power threshold obtained after the negotiation, an operation such as cutting off power supply for the power supply port connected to the load, to manage the obtaining of power by the load from the power supply device.

If the power supply device includes a plurality of power supply ports, for one load connected to the communications port, the power supply device cannot determine which one of the plurality of power supply ports is connected to the load. Therefore, when the power supply device includes a plurality of power supply ports, the power supply device may further establish a correspondence between a power supply port and a communications port that are connected to a single load, to manage, based on the correspondence, the obtaining of power by the load from the power supply device.

For one load connected to a power supply port in the plurality of power supply ports, that the power supply device manages, based on the foregoing correspondence, the obtaining of power by the load from the power supply device means that the power supply device manages, based on the correspondence and content of communication between the load and a communications port connected to the load, obtaining power by the load from the power supply port connected to the load. For example, when the power supply device determines a power threshold of the load based on the content of communication between the load and the communications port connected to the load, the power supply device finds, based on the correspondence, the power supply port connected to the load, and manages the power supply port by using the power threshold of the load. If an output power of the power supply port exceeds the power threshold, the power supply device cuts off power supply for the power supply port.

For one load connected to a power supply port in the plurality of power supply ports, an implementation in which the power supply device establishes a correspondence between a power supply port and a communications port that are connected to the load may be as follows: The power supply device measures an output power of each of the plurality of power supply ports; the power supply device determines, based on content of communication between the power supply device and the load through the communications port, that a power-obtaining power of the load increases by a target value; and the power supply device searches for a power supply port whose output power increases by the target value, to obtain and record the correspondence between the power supply port connected to the load and the communications port connected to the load.

In a possible implementation, the power supply device determines, based on content of communication between the power supply device and the load through the communications port, that a power-obtaining power of the load increases by a target value as follows: The load performs an action that needs to consume an additional power. The load determines the additional power that needs to be consumed by performing the action, and uses a value of the power as the target value. The load may send the target value to the power supply device through the communications port. The load may perform the foregoing action before sending the target value, after sending the target value, or while sending the target value. The power supply device receives the target value. The power supply device checks a change of the output power of each power supply port. If the load has performed the action before the power supply device receives the target value, the power supply device checks historical data of the output power of each power supply port. If the load performs the action after the power supply device receives the target value, the power supply device checks a change of a real-time output power of each power supply port. The power supply device records a correspondence between a power supply port that is found by the power supply device and whose output power increases by the target value and a communications port that receives the target value.

For example, when the load is a strobe light, the action performed by the load may be flashing. The strobe light sends, to the power supply device, a value of a power additionally consumed by flashing, so that the power supply device establishes a correspondence between a power supply port connected to the strobe light and a communications port connected to the strobe light.

For another example, when the load is video monitor, the action performed by the load may be rotating a camera. Because a motor needs to be started to rotate the camera, an additional power needs to be consumed. The video monitor sends, to the power supply device, a value of the power that needs to be additionally consumed by rotating the camera, so that the power supply device establishes a correspondence between a power supply port connected to the rotated camera and a communications port connected to the rotated camera.

In this embodiment, there are mainly the following implementations in which the power supply device negotiates, based on content of communication performed through the communications port, with the load about a power threshold at which the load obtains power from the power supply port.

In a possible implementation, the load sends a power negotiation parameter to the power supply device through the communications port, where the power negotiation parameter carries a power threshold at which the load subsequently expects to obtain power from the power supply port. When receiving the power negotiation parameter, the power supply device determines whether to allow the load to obtain power based on the power threshold carried in the power negotiation parameter. If the power supply device allows the load to obtain power based on the power threshold carried in the power negotiation parameter, the power supply device manages the power-obtaining behavior of the load based on the power threshold carried in the power negotiation parameter. If the power supply device does not allow the load to obtain power based on the power threshold carried in the power negotiation parameter, the power supply device sends a rejection message to the load through the communications port, and the power supply device still manages the power-obtaining behavior of the load based on a previous power threshold. For example, a current power threshold of the power supply port connected to the load is 20 W, and the power threshold carried in the power negotiation parameter sent by the load to the power supply device is 30 W. If the power supply device allows the load to obtain power based on the power threshold carried in the power negotiation parameter, when a power at which the load obtains power from the power supply port is 30 W subsequently, the power supply device does not perform any operation. If the power supply device does not allow the load to obtain power based on the power threshold carried in the power negotiation parameter, when a power at which the load obtains power from the power supply port is 30 W subsequently, the power supply device cuts off power supply for the power supply port connected to the load. In this case, although a to-be-negotiated power threshold is provided by the load, whether the load can obtain power from the power supply port based on the to-be-negotiated power threshold depends on the power supply device.

In another possible implementation, the power supply device sends a power negotiation parameter to the load through the communications port. In this case, the power negotiation parameter carries a power threshold at which the power supply device allows the load to obtain power from the power supply port. After the power supply device sends the power negotiation parameter, if the power-obtaining power of the load is greater than the power threshold carried in the power negotiation parameter, the power supply device cuts off power supply for the power supply port connected to the load. If the power-obtaining power of the load is not greater than the power threshold carried in the power negotiation parameter, the power supply device does not perform any operation. For example, the power threshold carried in the power negotiation parameter sent by the power supply device to the load is 30 W. Subsequently, if a power at which the load obtains power from the power supply port exceeds 30 W, the power supply device cuts off power supply for the power supply port connected to the load. If a power at which the load obtains power from the power supply port does not exceed 30 W, the power supply device does not perform any operation. In this case, a to-be-negotiated power threshold is configured only by the power supply device, and has nothing to do with the load.

Optionally, in this embodiment, the load may directly obtain power from the power supply device based on a requirement of the load. In this case, the load only needs to send a power negotiation parameter to the power supply device through the communications port, where the power negotiation parameter carries a power threshold at which the load subsequently obtains power from the power supply port. After the load sends the power negotiation parameter to the power supply device, the load may obtain power from the power supply port based on the power threshold carried in the power negotiation parameter. For example, if the power threshold carried in the power negotiation parameter sent by the load to the power supply device is 30 W, it indicates that an upper limit of a power at which the load subsequently obtains power from the power supply port is 30 W.

For example, after the load is connected to the power supply device for the first time, a power threshold at which the power supply device supplies power to the load is the initial power threshold. If the power supply device or the load subsequently needs to increase the power threshold, the power supply device and the load may negotiate about the power threshold through the communications port in the foregoing three implementations. For example, the power supply device and the load perform negotiation to increase the power threshold of the power supply port to a power threshold greater than the initial power threshold, so that the power supply device limits, based on a power threshold obtained after the negotiation, the power at which the power supply port supplies power to the load.

For another example, after the power supply device limits, based on the power threshold obtained after the negotiation, the power at which the power supply port supplies power to the load, the power supply device may decrease the power threshold of the power supply port connected to the load, to re-manage obtaining power by the load from the power supply device. For example, the power supply device limits, based on a first power threshold, the power at which the power supply port supplies power to the load; the power supply device sends a power indication to the load through the communications port, where the power indication carries a second power threshold, the second power threshold is less than the first power threshold, and the power indication is used to indicate that the power at which the load obtains power from the power supply device is limited by the second power threshold; and the power supply device limits, based on the second power threshold, the power at which the power supply port supplies power to the load.

In this case, when the power supply device sends the power indication to the load through the communications port, the following application scenario exists: The power supply device configures a priority for each load connected to the power supply device in advance, for example, there are four loads that are sequentially named a load 0, a load 1, a load 2, and a load 3 in descending order of priorities. It is assumed that a total power-supply power of the power supply device is 90 W, only the load 1, the load 2, and the load 3 are currently connected to the power supply device, and a total power-obtaining power of the load 1, the load 2, and the load 3 reaches 90 W. If the load 0 is currently connected to the power supply device and a power-obtaining power of the load 0 may be only 10 W, the foregoing operation needs to be performed on the load 3, to reduce the power at which the load 3 obtains power from the power supply device, thereby ensuring that the load 0 can succeed in obtaining power from the power supply device.

In addition, for a load connected to the power supply device, a process in which the power supply device negotiates with the load about a power threshold at which the load obtains power from the power supply port may be performed for one or more times, and this is not specifically limited in this embodiment of this disclosure. Therefore, according to the power supply method provided in this embodiment, the power supply device may negotiate with the load for a plurality of times about the power threshold at which the load obtains power, to improve flexibility of supplying power by the power supply device to the load.

In this disclosure, the power supply device supplies power to the load through the power supply port, and then manages, through the communications port, the obtaining of power by the load from the power supply device. A power supply process between the power supply device and the load and a communication process between the power supply device and the load are physically isolated from each other, thereby improving flexibility of supplying power by the power supply device to the load.

Figure 4:
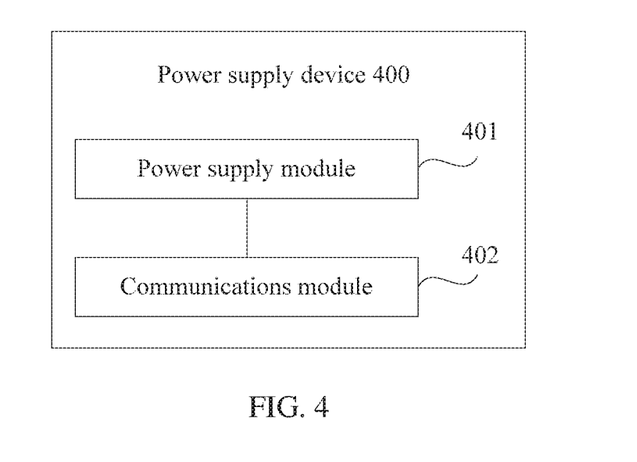
FIG. 4 is a schematic structural diagram of a power supply device according to an embodiment.

FIG. 4 shows a power supply device according to an embodiment of this disclosure. As shown in FIG. 4, the power supply device 400 includes: a power supply module 401, configured to perform step 301 in the embodiment in FIG. 3; and a communications module 402, configured to perform step 302 in the embodiment in FIG. 3.

Optionally, the power supply device 400 includes a plurality of power supply ports.

The power supply device 400 further includes: a measurement module 403, configured to measure an output power of each of the plurality of power supply ports; a determining module 404, configured to determine, based on content of communication between the power supply device 400 and the load through the communications port, that a power-obtaining power of the load increases by a target value; and a record module 405, configured to search for a power supply port whose output power increases by the target value, to obtain and record a correspondence between a power supply port connected to the load and a communications port connected to the load.

That the power supply device 400 manages obtaining power by the load from the power supply device includes: managing, by the power supply device based on the correspondence and content of communication between the load and the communications port connected to the load, obtaining power by the load from the power supply port connected to the load.

Optionally, that the power supply device 400 manages obtaining power by the load from the power supply device includes: limiting, by the power supply device 400 based on a first power threshold, a power at which the power supply port supplies power to the load; sending, by the power supply device 400, a power indication to the load through the communications port, where the power indication carries a second power threshold, the second power threshold is less than the first power threshold, and the power indication is used to indicate that the power at which the load obtains power from the power supply device 400 is limited by the second power threshold; and limiting, by the power supply device 400 based on the second power threshold, the power at which the power supply port supplies power to the load.

Optionally, the power supply module 401 is specifically configured to: when the load is initially connected to the power supply port of the power supply device, limit, based on an initial power threshold, a power at which the power supply port supplies power to the load.

Correspondingly, that the power supply device manages obtaining power by the load from the power supply device includes: obtaining a third power threshold based on the content of communication between the power supply device 400 and the load through the communications port, where the third power threshold is greater than the initial power threshold; and limiting, based on the third power threshold, the power at which the power supply port supplies power to the load.

In this disclosure, the power supply device supplies power to the load through the power supply port, and then manages, through the communications port, obtaining power by the load from the power supply device. A power supply process between the power supply device and the load and a communication process between the power supply device and the load are physically isolated from each other, thereby improving flexibility of supplying power by the power supply device to the load.

It should be noted that when the power supply device provided in the foregoing embodiment supplies power to the load, division of the foregoing function modules is only used as an example for description. In actual application, the foregoing functions may be allocated to different function modules for implementation according to a requirement, that is, an internal structure of a device is divided into different function modules to implement all or some of the functions described above. In addition, the power supply device provided in the foregoing embodiment and the power supply method embodiment pertain to a same concept. For a specific implementation process of the power supply device, refer to the method embodiment. Details are not described herein again.

Figure 5:
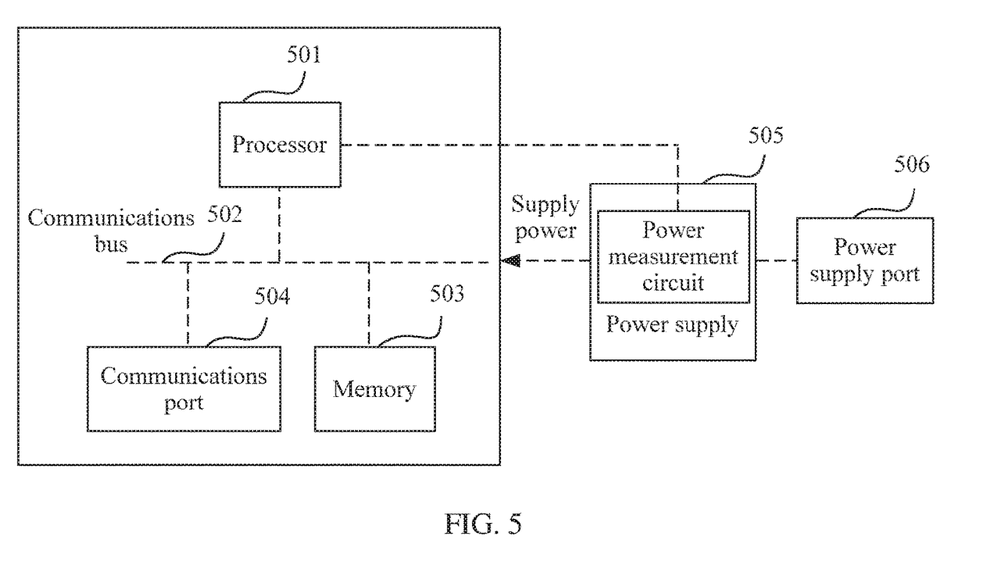
FIG. 5 is a schematic structural diagram of another power supply device according to an embodiment.

FIG. 5 is a schematic structural diagram of a power supply device according to an embodiment of this disclosure. The power supply device shown in FIG. 4 may be implemented by using the structure shown in FIG. 5. As shown in FIG. 5, the power supply device 500 includes at least one processor 501, a communications bus 502, a memory 503, at least one communications port 504, a power supply 505, and at least one power supply port 506.

The processor 501 may be a central processing unit (central processing unit, CPU) or one or more integrated circuits configured to control program execution of the solution of this disclosure. In implementation, in an embodiment, the power supply device may include a plurality of processors, and each of the processors may be a single-core processor or a multi-core processor. The processor herein may be one or more devices, circuits, and/or processing cores for processing data (such as a computer program instruction).

The communications bus 502 may include a channel used to transmit information between the foregoing components.

The memory 503 may be a read-only memory (read-only memory, ROM), a random access memory (random access memory, RAM), an electrically erasable programmable read-only memory (electrically erasable programmable read-only memory, EEPROM), an optical disc, a magnetic disk storage medium or another magnetic storage device, or any other medium that can be used to carry or store expected program code in a form of an instruction or a data structure and that can be accessed by a computer. The memory 503 may exist independently, and is connected to the processor 501 by using the communications bus 502. Alternatively, the memory 503 may be integrated into the processor 501. The memory 503 is configured to store program code for executing the solutions of this disclosure, and the processor 501 controls the execution. The processor 501 is configured to execute the program code stored in the memory 503. The program code may include one or more software modules.

The communications port 504 is configured to communicate with another device or a communications network, such as the Ethernet. The another device may be a load in the power supply system provided in FIG. 1, and the communications port 504 may be the communications port shown in FIG. 2.

The power supply 505 is configured to supply power to an entire system of the power supply device and a load connected to the power supply device. The at least one power supply port 506 is connected to the power supply 505, and each power supply port 506 is configured to be connected to a power receiving port of the load, to supply power to the load. In addition, as shown in FIG. 5, a power measurement circuit may be further integrated into the power supply 505. The power measurement circuit is configured to: detect a power-supply power of each power supply port 506, and report a detection result to the processor 501. The processor manages, according to the method provided in this disclosure, obtaining power by the load from the power supply device. The processor may instruct the power supply 505 whether to supply power to one or more power supply ports 506.

All or some of the foregoing embodiments may be implemented by using software, hardware, or a combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this disclosure are generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer readable storage medium may be any medium accessible by a computer, or a data storage device, such as a server or a data center, integrating one or more media. The usable medium may be a magnetic medium (for example, a floppy disk, a hard disk, or a magnetic tape), an optical medium (for example, an optical disc), a semiconductor medium (for example, a solid-state drive (SSD)), or the like.

What is claimed is:

1. A power supply method, wherein the method comprises:
   supplying, by a power supply device having a plurality of power supply ports, power to a load through a power supply port, wherein the power supply port is connected to a power receiving port of the load by using a power supply cable;
   measuring, by the power supply device, an output power of each of the plurality of power supply ports;
   determining, by the power supply device based on content of communication between the power supply device and the load through a corresponding communications port, that a power-obtaining power of the load increases by a target value;
   searching for, by the power supply device, a power supply port whose output power increases by the target value, to obtain and record a correspondence between a power supply port coupled with an increasing load and a communications port coupled with the increasing load; and
   managing a behavior of obtaining power by the load from the power supply device based on the correspondence and content of communication between the increasing load and the communications port coupled with the increasing load.

2. The power supply method according to claim 1, wherein the communications port is connected to the communications port of the load by a communications cable.

3. The power supply method according to claim 1, wherein the power supply device manages a behavior of obtaining power by the load from the power supply device, further comprising:
   limiting, by the power supply device based on a first power threshold, a power at which the power supply port supplies power to the load;
   sending, by the power supply device, a power indication to the load through the communications port, wherein the power indication carries a second power threshold, the second power threshold is less than the first power threshold, and wherein the power indication is used to indicate that the power at which the load obtains power from the power supply device is limited by the second power threshold; and
   limiting, by the power supply device, based on the second power threshold, the power at which the power supply port supplies power to the load.

4. The power supply method of claim 3, wherein the first power threshold is preset in the power supply device.

5. The power supply method according to claim 1, wherein the supplying, by a power supply device, power to a load through a power supply port further comprises:
   when the load is initially connected to the power supply port of the power supply device, limiting, by the power supply device based on an initial power threshold, a power at which the power supply port supplies power to the load; and the power supply device managing a behavior of obtaining power by the load from the power supply device comprises:

obtaining, by the power supply device, a third power threshold based on the content of communication between the power supply device and the load through the communications port, wherein the third power threshold is greater than the initial power threshold; and limiting, by the power supply device based on the third power threshold, the power at which the power supply port supplies power to the load.

6. The power supply method of claim 1, wherein the power supply device temporarily supplies a low power to a load to provide sufficient energy to communicate with the power supply device when the load is initially connected to the power supply device.

7. A power supply device comprising:
a plurality of power supply ports;
a plurality of loads coupled to power supply ports;
a power measurement circuit configured for measuring an output power of each of the plurality of power supply ports;
a determining circuit configured for determining, based on communication between the power supply device and the coupled loads through corresponding communications ports, that power supplied to an increasing load increases by a target value;
a record circuit configured for searching for a power supply port whose output power increased by the target value, and obtaining and recording a correspondence between a power supply port coupled to the increasing load and a communications port coupled with the increasing load; and
a processor configured for managing, based on the correspondence and the communication between the increasing load and the communications port connected to the increasing load, the obtaining of power by the increasing load from a corresponding power supply port.

8. The power supply device of claim 7, wherein the processor is further configured to:
limit, based on a first power threshold, the power a first power supply port supplies to a first load;
send a power indication to the first load through a first communications port, wherein the power indication carries a second power threshold, wherein the second power threshold is less than the first power threshold and indicates that the power supplied to the first load from the power supply device is limited by the second power threshold; and
limit, based on the second power threshold, the power the first power supply port supplies to the first load.

9. The power supply device of claim 7, wherein the processor is further configured to:
limit, based on an initial power threshold, power a first power supply port supplies to a first load when the first load is initially connected to the first power supply port;
obtain a third power threshold based on communication between the power supply device and the first load through a first communications port, wherein the third power threshold is greater than the initial power threshold; and
limit, based on the third power threshold, the power the first power supply port supplies to the first load.

10. The power supply device of claim 9, wherein the initial power threshold is preset in the power supply device.

11. The power supply device of claim 7, wherein a communications port comprises an optical interface.

12. The power supply device of claim 7, wherein a load comprises one or more of a camera, video monitor, electronic display board, or traffic intersection light.

13. The power supply device of claim 7, wherein a power supply port and a power receiving port comprise pluggable wiring terminals.

14. The power supply device of claim 7, wherein the power measurement circuit is integrated into a power supply circuit.

15. The power supply device of claim 7 further comprising;
a power supply cable coupling the power supply port to a power receiving port of the increasing load; and
a communications cable coupling the communication port of the power supply port to a communications port of the increasing load.

16. A computer program product comprising computer-executable instructions stored on a non-transitory computer-readable medium that, when executed by a processor, cause a power supply apparatus to:
measure an output power of each of a plurality of power supply ports;
determine, based on communication between the power supply apparatus and a plurality of loads coupled to the power supply ports through corresponding communications ports, that power supplied to an increasing load increases by a target value;
search for a power supply port having an output power increased by the target value;
obtain and record a correspondence between a power supply port coupled with the increasing load and a communications port coupled with the increasing load; and
manage, based on the correspondence and communication between the increasing load and the communications port coupled with the increasing load, an obtaining of power by the increasing load from the power supply port connected to the increasing load.

17. The computer program product of claim 16, wherein the computer-executable instructions, when executed by a processor, cause the power supply apparatus to:
limit, based on an initial power threshold, a power the first power supply port supplies to the first load when the first load is initially connected to the first power supply port;
obtain a third power threshold based on the communication between the power supply apparatus and the first load through the first communications port, wherein the third power threshold is greater than the initial power threshold; and
limit, based on the third power threshold, the power the first power supply port supplies to the first load.

18. The computer program product of claim 16, wherein the computer-executable instructions, when executed by a processor, cause the power supply apparatus to temporarily supply a low power to a load to provide sufficient energy to communicate with the power supply apparatus when the load is initially connected to the power supply apparatus.

19. The computer program product of claim 16, wherein the computer-executable instructions, when executed by a processor, cause the power supply apparatus to:
limit, based on a first power threshold, the power the first power supply port supplies to the first load;

send a power indication to the first load through the first communications port, wherein the power indication carries a second power threshold, and wherein the second power threshold is less than the first power threshold and indicates that the power supplied to the first load from the power supply apparatus is limited by the second power threshold; and limit, based on the second power threshold, the power the power first supply port supplies to the first load.

20. The computer program product of claim 16, wherein the computer-executable instructions, when executed by a processor, cause the power supply apparatus to preset the first power threshold in the power supply device.

* * * * *